(12) United States Patent
Adomeit et al.

(10) Patent No.: US 7,563,033 B2
(45) Date of Patent: Jul. 21, 2009

(54) HOUSING FOR FIBER-OPTIC PLUG-IN CONNECTOR, AND A METHOD FOR LAYING FIBER-OPTIC CABLES

(75) Inventors: Jorg Adomeit, Berlin (DE);
Hans-Joachim Faika, Berlin (DE);
Hans-Peter Sandeck, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 10/571,409

(22) PCT Filed: Sep. 10, 2004

(86) PCT No.: PCT/EP2004/010088

§ 371 (c)(1),
(2), (4) Date: Dec. 15, 2006

(87) PCT Pub. No.: WO2005/036229

PCT Pub. Date: Apr. 21, 2005

(65) Prior Publication Data

US 2007/0172173 A1 Jul. 26, 2007

(30) Foreign Application Priority Data

Sep. 17, 2003 (DE) ................ 103 42 908

(51) Int. Cl.
*G02B 6/36* (2006.01)
*G02B 6/38* (2006.01)
(52) U.S. Cl. ............ 385/55; 385/53; 385/76; 385/77; 385/78
(58) Field of Classification Search ........ 385/53–94
See application file for complete search history.

(56) References Cited

U.S. PATENT DOCUMENTS

| 5,076,656 A | 12/1991 | Briggs et al. |
| 5,461,690 A | 10/1995 | Lampert |
| 5,481,634 A | 1/1996 | Anderson et al. |
| 5,579,425 A | 11/1996 | Lampert et al. |
| 5,638,474 A | 6/1997 | Lampert et al. |

(Continued)

FOREIGN PATENT DOCUMENTS

EP 0 076 513 8/1986

(Continued)

*Primary Examiner*—Frank G Font
*Assistant Examiner*—Jerry Blevins
(74) *Attorney, Agent, or Firm*—Merchant & Gould P.C.

(57) ABSTRACT

The invention relates to a housing for fiber-optic plug-in connectors. According to the invention, said housing is configured in at least two parts, one end of a core cable can be positioned in the housing and the position of said cable can be fixed in said housing, at least one housing part is equipped with an opening and the housing part can engage over the core cable in a transversal direction by means of the opening. The invention also relates to a method for laying fiber-optic cables, which can be manufactured with plug-in connectors, whereby at least one end of a core cable is laid in a plug-in station, the end of the core cable is positioned in a housing part, the position of the core cable is fixed in the housing part by at least one second housing part and at least one housing part, which is provided with an opening, engages over the core cable in a transversal direction.

13 Claims, 1 Drawing Sheet

U.S. PATENT DOCUMENTS

Figure 1:
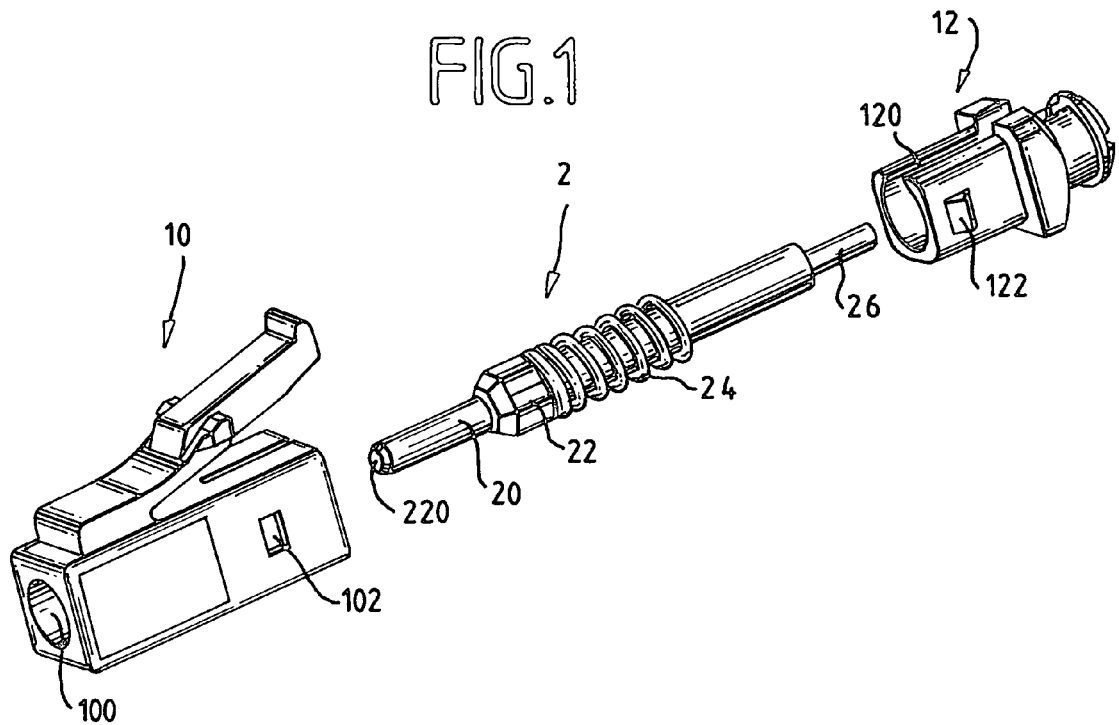

| | | | |
|---|---|---|---|
| 5,647,043 A | 7/1997 | Anderson et al. | |
| 6,022,150 A | 2/2000 | Erdman et al. | |
| 6,151,432 A * | 11/2000 | Nakajima et al. | 385/60 |
| 6,206,580 B1 * | 3/2001 | Nagaoka et al. | 385/78 |
| 6,206,581 B1 | 3/2001 | Discoll et al. | |
| 6,217,230 B1 * | 4/2001 | Matsushita | 385/78 |
| 6,234,685 B1 | 5/2001 | Carlisle et al. | |
| 6,250,817 B1 | 6/2001 | Lampert et al. | |
| 6,287,018 B1 | 9/2001 | Andrews et al. | |
| 6,293,710 B1 | 9/2001 | Lampert et al. | |
| 6,379,052 B1 | 4/2002 | de Jong et al. | |
| 6,409,392 B1 | 6/2002 | Lampert et al. | |
| 6,485,194 B1 | 11/2002 | Shirakawa | |
| 6,511,230 B1 | 1/2003 | Connelly et al. | |
| 6,540,410 B2 | 4/2003 | Childers et al. | |
| 6,565,262 B2 | 5/2003 | Childers et al. | |
| 6,619,856 B1 | 9/2003 | Lampert et al. | |
| 6,663,292 B1 * | 12/2003 | Shirakawa | 385/78 |
| 6,672,774 B2 | 1/2004 | Theuerkorn et al. | |
| 6,672,898 B2 | 1/2004 | Kahle et al. | |
| 6,705,765 B2 | 3/2004 | Lampert et al. | |
| 6,744,939 B2 | 6/2004 | Lampert et al. | |
| 6,848,836 B2 | 2/2005 | Ueda et al. | |
| 7,104,702 B2 | 9/2006 | Barnes et al. | |
| 2004/0072454 A1 | 4/2004 | Nakajima et al. | |

FOREIGN PATENT DOCUMENTS

JP  2000-39538  2/2000

\* cited by examiner

HOUSING FOR FIBER-OPTIC PLUG-IN CONNECTOR, AND A METHOD FOR LAYING FIBER-OPTIC CABLES

The invention relates to a housing for glass-fiber plug connectors and to a method for laying glass-fiber cables which can be fabricated with glass-fiber plug connectors.

It is known for glass-fiber cables to be fitted with plug connectors at one end (pigtail) or at both ends (patchcord). Glass-fiber cables can be connected quickly and such that they can be detached safely and reliably by means of plug connectors. Owing to their size, glass-fiber cables and/or conductors fitted with plug connectors, cannot, however, be laid without problems in all applications. It is known for a glass-fiber conductor and/or a glass-fiber cable to be laid first of all without any plug connectors. The laid glass-fiber cable is spliced at at least one free end to a glass-fiber cable (pigtail) which is prefabricated with a plug connector. The splicing of glass-fiber cables involves work which takes a long time and, in some case, is also possible only at special workstations.

The invention is thus based on the technical problem of providing an improved glass-fiber plug connector and an improved method for laying glass-fiber cables which can be fitted with glass-fiber plug connectors.

For this purpose, a housing for a glass-fiber plug connector is formed in two parts, in which at least one housing part has an opening, and the housing part can be latched over a conductor cable through an opening in the transverse direction. If the glass-fiber cable or the glass-fiber conductor is prefabricated without a housing for a plug connection, then the diameter of the prefabricated conductor cable is only insignificantly greater than the diameter of the free ends. The conductor cable can thus be laid without any problems for virtually all applications. If the conductor cable is prefabricated, then at least one housing part cannot be latched onto the conductor cable in the longitudinal direction, that is to say from the end of the laid conductor cable. The opening allows the housing part to be mounted on the laid, prefabricated conductor cable in a transverse direction, that is to say at an angle that is to not equal to 0° with respect to the longitudinal direction. The mounting process is preferably carried out at a plug-in location. The conductor cable may in this case be prefabricated for a plug connector at only one end. It is possible for the second end to already be fitted with a plug connector. For laying the conductor cable, it is often sufficient for one end not to be fitted with a plug connector. However, it is also just as feasible for the second end to be free. The free end is, for example, suitable for splicing to racks and/or housings.

In a further embodiment, the conductor cable is prefabricated with a ferrule. In a plug connection for glass-fiber cables, the ends to be connected touch on end surfaces of the ferrules. The fitting of a ferrule to the conductor cable requires high precision. The conductor cable is thus preferably prefabricated with the ferrule. In order to lay the conductor cable, the ferrule can be protected by a suitable apparatus, for example a cap.

In a further embodiment, a compression spring can be prestressed by means of the housing, in which case the position of the ferrule and of the conductor cable in the housing can be secured by means of the compression spring. The compression spring is preferably mounted in advance on the conductor cable.

In a further preferred embodiment, the housing parts are latched. Latching connections allow precise, secure and direct connection of components.

In a further preferred embodiment, the housing has a plug housing and a closure cap, in which case the closure cap can be connected to the plug housing in the longitudinal direction of the conductor and the closure cap has a slot for latching onto the conductor cable. Conductor cables which are fitted with plug connectors have, for example, a secondary coating, and have a diameter of 0.9 mm. The slot may be very narrow for an embodiment of the conductor cable such as this. However, glass-fiber cables with different diameters, for example 2.4 mm or 3 mm, are also known. The slot must therefore be designed appropriately for the application. The connection of the closure cap to the plug housing in the longitudinal direction of the conductor cable means that the compression spring in the connection can be prestressed. This allows particularly simple handling. However, it is also feasible for the housing to have two housing shells in which the conductor cable is embedded.

In a further preferred embodiment, the closure cap has two latching tabs, and the plug housing has latching eyes which are complementary to them. The arrangement of latching tabs and latching eyes is preferably chosen so as to avoid undercuts, so that the parts can be produced at low cost, for example as die-cast or extrusion-molded parts.

In a further preferred embodiment, the closure cap has a flange. The flange is used as a contact surface for the connection of the closure cap to the plug housing.

In one preferred embodiment, the housing is in the form of an LC, FC, MTRJ, E2000, SC, Duplex-SC, ST or DIN plug. Detachable connections are required for many reasons within a glass-fiber network, for example in order to allow switching and/or simple access for measurements. The plug connector must be chosen appropriately, depending on the application and/or field of use.

The invention will be explained in more detail in the following text with reference to a preferred exemplary embodiment. In the figures:

FIG. 1: shows a schematic illustration of an unmounted plug connector, and

Figure 2:
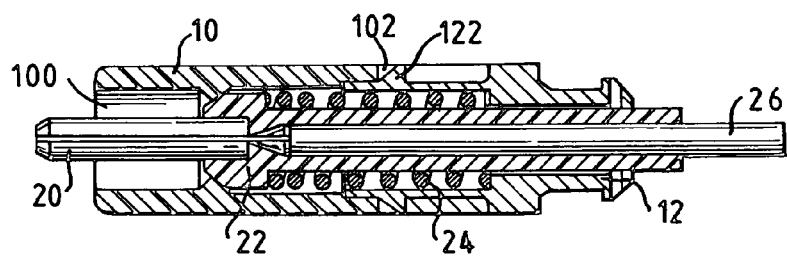

FIG. 2: shows a section through a mounted plug connector.

FIG. 1 shows, schematically, an unmounted plug connector having a plug housing 10, a closure cap 12 and a prefabricated conductor cable 2. The prefabricated conductor cable 2 has a ferrule 20, a ferrule flange 22, a compression spring 24 and a conductor 26. The plug housing 10 has an opening 100 for the ferrule 20. The connection to a further glass-fiber cable is made via the end surface 220 of the ferrule 20.

The prefabricated conductor cable 2 is laid at its point of use. By way of example, the conductor 26 has a secondary coating, and has a diameter of approximately 0.9 mm. Owing to the prefabrication, the diameter of the conductor cable 2 at the illustrated end is only slightly greater than the diameter of the conductor 26. The prefabrication therefore restricts the laying of the conductor cable 2 only to an insignificant extent.

The conductor cable 2 is positioned in the plug housing 10, with the ferrule flange 22 resting on a contact surface, which cannot be seen, in the plug housing. The position of the conductor cable 2 in the plug housing 10 is secured by means of the closure cap 12 and the compression spring 24. The closure cap 12 is latched onto the plug housing 10 in the longitudinal direction of the conductor. For this purpose, the closure cap 12 has two latching tabs 122, and the plug housing 10 has latching eyes 102 which are complementary to them. In the illustrated view, only one latching tab 122 and one latching eye 102 can be seen. The second latching pair is arranged symmetrically with respect to the center axis thereof.

The internal diameter of the closure cap 12 is, at least in places, less than the external diameter of the conductor cable 2 on the ferrule flange 22 and/or the compression spring 24. The closure cap 12 can in consequence not be plugged onto the conductor cable 2 via a prefabricated end in the longitudinal direction. According to the invention, the closure cap 12 has a slot 120. The slot 120 is in this case preferably formed over the entire length of the closure cap 12. The slot 120 allows the closure cap 12 to be latched to the laid prefabricated conductor cable 2 in a transverse direction at the plug-in location.

FIG. 2 show, schematically, a section through a mounted plug connector, comprising the plug housing 10, the closure cap 12 and the prefabricated conductor cable 2. The ferrule 20 is connected to the conductor 26 via the ferrule flange 22. One end surface 220 of the ferrule flange 22 rests on a contact surface 104 on the plug housing 10. The compression spring 24 is prestressed by latching the closure cap 12 onto the plug housing 10. The position of the conductor cable 2 is thus secured by means of the compression spring 24 and the closure cap 12.

The illustrated plug housing 10 is in the form of an LC plug housing. LC plug connectors are used, for example, for telecommunication applications, LAN in-house networks, cable television, fiber to the home, and/or fiber to the desk. Typical cable configurations for LC plug connectors are, for example, a 0.9 mm conductor, a 1.8 mm cable or a duplex cable. The ferrule 20 of an LC plug connection is in the form of an SFF (small form factor) ferrule with a diameter of 1.25 mm. Owing to the small dimensions of the illustrated LC plug connection, LC plug connections can be used in a versatile manner and flexibly. However, the invention is not restricted to LC plug connections.

LIST OF REFERENCE SYMBOLS

2 Conductor cable
10 Plug housing
12 Closure cap
20 Ferrule
22 Ferrule flange
24 Compression spring
26 Conductor
100 Opening
102 Post eye
120 Slot
122 Latching tab
220 End surface

The invention claimed is:

1. A housing for fibre-optic plug connectors, comprising:
a housing body with the housing body having at least two housing parts, in which one end of a conductor cable can be positioned and the position of the conductor cable in the housing body can be secured, the conductor cable defining a longitudinal axis, wherein at least a first of the housing parts defines a first opening, wherein the first housing part includes a latching tab and is configured to be latched over the conductor cable through the first opening in a transverse direction to the longitudinal axis, wherein a second of the housing parts defines a second opening sized to receive the latching tab of the first housing part; and wherein the housing parts include a closure cap, wherein at least the closure cap is formed with an opening for latching onto the conductor cable, and the opening is in the form of a slot.

2. The housing as claimed in claim 1, wherein the conductor cable can be accommodated in the housing, with the end of the conductor cable being prefabricated at least with a ferrule.

3. The housing as claimed in claim 2, wherein a compression spring can be prestressed by the housing, the compression spring being mounted on the end of the conductor cable before the end of the conductor cable is positioned in the housing, and a position of the ferrule and of the conductor cable in the housing can be secured by the compression spring.

4. The housing as claimed in claim 1, wherein the housing parts can be connected via a latching connection.

5. The housing as claimed in claim 1, wherein the housing parts also include a plug housing, the closure cap being configured be connected to the plug housing in a longitudinal direction of the conductor cable.

6. The housing as claimed in claim 5, wherein the closure cap has two latching tabs, and the plug housing has latching eyes which are complementary to the latching tabs.

7. The housing as claimed in claim 5, wherein the closure cap has a flange.

8. The housing as claimed in claim 1, wherein the housing forms an FC, MTRJ, SC, Duplex-SC, LC, E2000, ST or DIN plug.

9. A housing for fibre-optic plug connectors, comprising:
a housing body with the housing body having at least two housing parts, in which one end of a conductor cable can be positioned and the position of the conductor cable in the housing body can be secured, the conductor cable defining a longitudinal axis, wherein at least one of the housing parts has an opening, and at least one housing part can be latched over the conductor cable through the opening in a transverse direction to the longitudinal axis;
wherein the housing parts include a plug housing and a closure cap, the closure cap being configured to be connected to the plug housing in a longitudinal direction of the conductor cable, wherein at least the closure cap is formed with an opening for latching onto the conductor cable, and the opening is in the form of a slot.

10. The housing as claimed in claim 9, wherein the closure cap has two latching tabs, and the plug housing has latching eyes which are complementary to the latching tabs.

11. The housing as claimed in claim 9, wherein the closure cap has a flange.

12. A method for laying fibre-optic cables, in which at least one end of a conductor cable is laid to a plug-in location, comprising:
positioning the end of the conductor cable in a first housing part of a housing, and
securing the position of the conductor cable in the first housing part by a second housing part of the housing, wherein at least one of the first and second housing parts, which has an opening, is latched over the conductor cable in a transverse direction to a longitudinal axis defined by the conductor cable;
wherein the first and second housing parts include a plug housing and a closure cap, with the closure cap having a slot and being latched onto the conductor cable, and the closure cap being connected to the plug housing in a longitudinal direction of the conductor cable.

13. A fibre optic plug connector comprising:
a plug housing having a first end and a second end, the plug housing defining a through opening extending from the first end to the second end, the through opening of the plug housing being configured to receive one end of a conductor cable having a longitudinal axis, the plug housing also defining first and second side openings on opposite sides of the plug housing; and a cable cap configured to fit inside the through opening of the plug housing to secure the conductor cable to the plug housing, the cable cap defining a longitudinal slot extending from a first end of the cable cap to a second end of the cable cap, the slot being sized to enable passage of the conductor cable through the slot to enable the cable cap to mount to the conductor cable, the cable cap also defining first and second latching tabs protruding radially from the cable cap, the first and second latching tabs being configured to fit within the first and second openings, respectively, of the plug housing.

* * * * *

UNITED STATES PATENT AND TRADEMARK OFFICE
CERTIFICATE OF CORRECTION

PATENT NO. : 7,563,033 B2
APPLICATION NO. : 10/571409
DATED : July 21, 2009
INVENTOR(S) : Adomeit et al.

Page 1 of 1

It is certified that error appears in the above-identified patent and that said Letters Patent is hereby corrected as shown below:

Col. 4, line 15, claim 5: "figured be connected to the" should read --figured to be connected to the--

Signed and Sealed this

Eighteenth Day of May, 2010

David J. Kappos
*Director of the United States Patent and Trademark Office*